(12) United States Patent
Lindsay

(10) Patent No.: US 11,945,078 B2
(45) Date of Patent: Apr. 2, 2024

(54) VISE JAWS FOR HOLDING IRREGULAR SHAPED OBJECTS AND METHOD OF INSTALLING THEM ON PRIOR ART VISES

(71) Applicant: Steven James Lindsay, Kearney, NE (US)

(72) Inventor: Steven James Lindsay, Kearney, NE (US)

( * ) Notice: Subject to any disclaimer, the term of this patent is extended or adjusted under 35 U.S.C. 154(b) by 341 days.

(21) Appl. No.: 17/384,734

(22) Filed: Jul. 24, 2021

(65) Prior Publication Data

US 2023/0009028 A1 Jan. 12, 2023
US 2024/0001514 A9 Jan. 4, 2024

Related U.S. Application Data

(63) Continuation-in-part of application No. 17/369,858, filed on Jul. 7, 2021, which is a continuation-in-part of application No. 17/368,072, filed on Jul. 6, 2021, which is a continuation-in-part of application No. 17/366,603, filed on Jul. 2, 2021, now Pat. No. 11,826,884.

(51) Int. Cl.
*B25B 1/24* (2006.01)
*B25B 1/20* (2006.01)
*B23Q 3/06* (2006.01)

(52) U.S. Cl.
CPC ............ *B25B 1/2452* (2013.01); *B23Q 3/062* (2013.01); *B25B 1/20* (2013.01); *B25B 1/241* (2013.01); *B25B 1/2436* (2013.01)

(58) Field of Classification Search
CPC ....... B25B 1/2426; B25B 1/20; B25B 1/2452; B23Q 3/062

USPC .................................................. 269/258, 267
See application file for complete search history.

(56) References Cited

U.S. PATENT DOCUMENTS

| | | | |
|---|---|---|---|
| 1,059,545 A * | 4/1913 | Kunze | B25B 5/163 269/258 |
| 1,256,217 A | 2/1918 | Fieldhouse | |
| 1,405,325 A | 1/1922 | Ludwig et al. | |
| 2,658,415 A | 11/1953 | Nathan et al. | |
| 3,077,346 A | 2/1963 | Lassy | |
| 3,103,353 A | 9/1963 | Lassy | |
| 4,047,709 A | 9/1977 | Thyberg et al. | |
| 4,632,374 A * | 12/1986 | Yang | B25B 1/20 269/261 |
| 4,717,132 A * | 1/1988 | Yang | B25B 7/04 269/261 |
| 4,732,373 A * | 3/1988 | Yang | B25B 1/20 269/241 |
| 4,969,638 A * | 11/1990 | Yang | B25B 1/2426 269/261 |

(Continued)

OTHER PUBLICATIONS

Mantle and Co. manufactured machine vise (Year: 2001).*

(Continued)

*Primary Examiner* — Mahdi H Nejad
(74) *Attorney, Agent, or Firm* — Ryan T. Grace; Advent, LLP

(57) ABSTRACT

The invention relates to vise pivotal jaws for holding irregular shaped objects and that are modular to work on various sized prior art vises. Also relates to pivotal jaws having aid to return back to a neutral center position. The design allows ease of disassembly for cleaning and reassembly.

20 Claims, 8 Drawing Sheets

(56) References Cited

U.S. PATENT DOCUMENTS 5,799,933 A * 9/1998 Yang ................... B25B 1/2426
269/261
5,984,321 A * 11/1999 Gruttadauria ..... B23B 31/16275
279/123
7,300,043 B1 * 11/2007 Lindsay ................... B25B 1/22
269/75

OTHER PUBLICATIONS

Morphing Fractal Engravinf Vise Jaws (Year: 2023).*
P.K. Kunze's Contribution to the world (Year: 1912).*
Rare Antique Fractal Vise; found at: (https://www.youtube.com/watch?v=QBeOgGt_oWU&t=13s ) (Year: 2021).*

* cited by examiner

VISE JAWS FOR HOLDING IRREGULAR SHAPED OBJECTS AND METHOD OF INSTALLING THEM ON PRIOR ART VISES

CROSS-REFERENCE TO RELATED APPLICATIONS

This is continuation-in-part of pending U.S. patent application Ser. No. 17/369,858 which was filed on 7 Jul. 2021, which is a continuation-in-part of pending U.S. patent application Ser. No. 17/368,072 which was filed on 6 Jul. 2021, which is a continuation-in-part of pending U.S. patent application Ser. No. 17/366,603 which was filed on 2 Jul. 2021.

BACKGROUND OF THE INVENTION

Field of Invention

The present invention relates to vise jaws for holding irregular shaped objects. The invention also relates to jaws that can be utilized on more than one size of vise by being modular. The invention also relates to construction of the morphing type jaws that can be taken apart easily by the end user for cleaning and reassembly. The invention also relates to aid in returning the morphing type jaws to their neutral position after un-clamping them from irregular shaped objects. Applicant, has been a hand engraver for 46 years and has used and made many vise jaw designs. Therefore the field of the invention use for the applicant is hand engraving and jewelry making fields, however the invention can be utilized in other fields that use a vise.

Description of Related Art

The traditional engravers ball vise which has been in existence since the nineteenth century, consists of a ball base resting in a doughnut type cradle. The top half of the ball is made to spin and tilt. On top of the ball are vise jaws.

Hand engravers as well as jewelers use this type of vise to hold an object they are working on. The objects that engravers and jewelers need to hold vary in shape and size greatly. Being able to clamp these objects securely for work operations to be carried out is required. Consequently, vise jaws that can hold irregular shaped objects would be most beneficent. U.S. Pat. No. 1,059,545 to Kunze and U.S. Pat. No. 1,405,325 to Posch teach milling machine type vises having nesting shape members, however they are stand alone units. In other words, there is no provision in the design for users to transfer the jaws to other vises. U.S. Pat. No. 1,405,325 to Posch teaches a milling machine type vise having nesting crescent-shaped members, holding pivotal jaws that adjust to the shape of the object being held in the vise when clamped. Referring to U.S. Pat. No. 1,405,325 to Posch, FIG. 3, the nested crescent-shaped members 11, 12, 13, 15, 17 and the pivotal jaws 20, 21 are held together utilizing mating male and female dovetail shapes 22, 23, 24 as illustrated in FIG. 4 (defined as overhanging shoulders and tongue structure in U.S. Pat. No. 1,405,325). A disadvantage to these dovetails is they can break and/or bend if one is over-pivoted and then clamped upon when the vise is tightened. When one does break or bend, it is difficult to repair the damage, as well as to even get them apart after the damage has occurred.

BRIEF SUMMARY OF THE INVENTION

It is the object of this invention to provide vise jaws that can conform to irregular shaped objects, and that are modular, so the user can utilize the jaws on other prior art vises and other prior vises that are smaller. It is also an object of this invention that the design of the jaws allow ease of disassembly by users for cleaning and reassembly. It is also the object of this invention that the jaws will have biasing help to return them to their neutral position after un-clamping them from irregular shaped objects.

BRIEF DESCRIPTION OF THE SEVERAL VIEWS OF THE DRAWINGS

FIG. 6 is a view from the rear that depicts features that can not be seen as well in FIG. 5.

FIG. 8 illustrates how jaws 20 and 21 are aligned and installed onto prior art ball vise 1, in accordance with the present invention.

FIG. 13 illustrates how sub-jaw 65 and sub-jaw 66 are aligned and installed on smaller prior art ball vise 10, in accordance with the present invention.

DETAILED DESCRIPTION OF THE INVENTION

Figure 1:
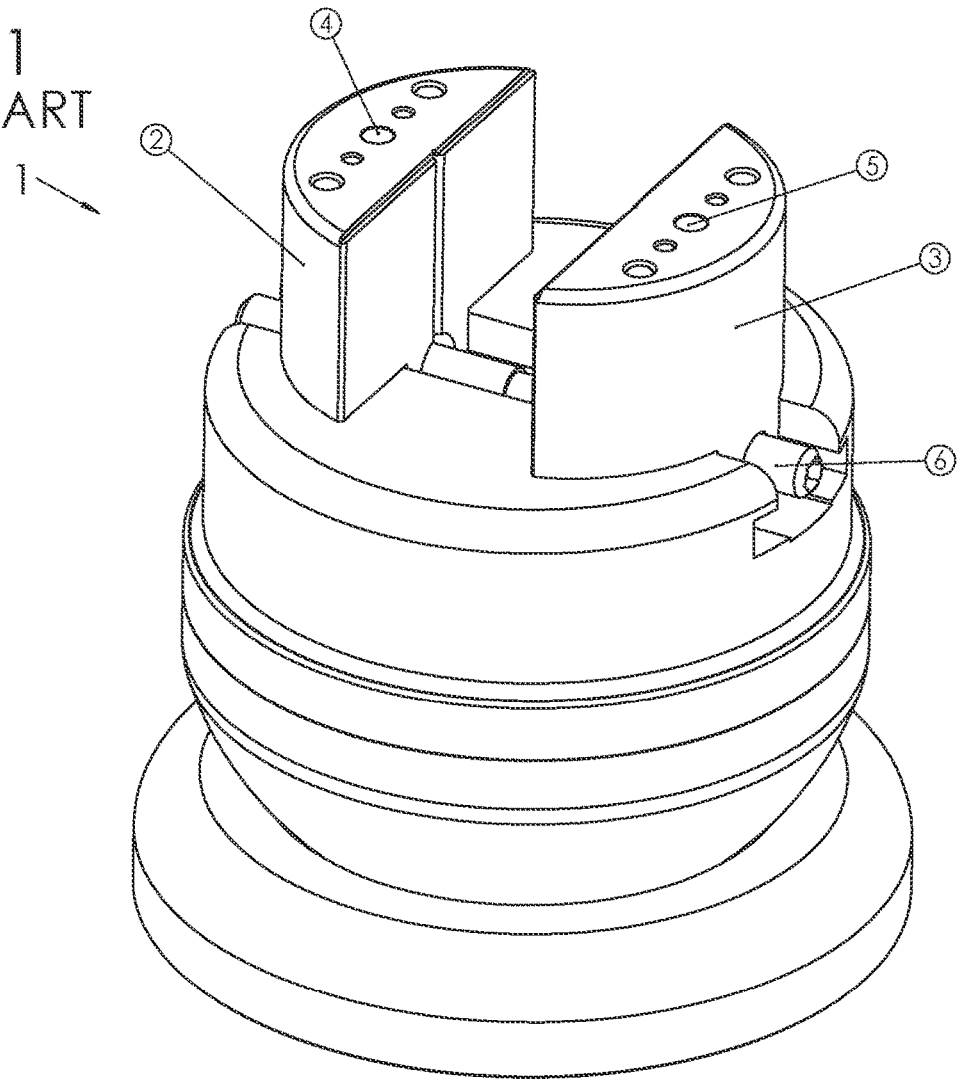
FIG. 1 is an isometric view of a prior art ball vise 1.
Figure 2:
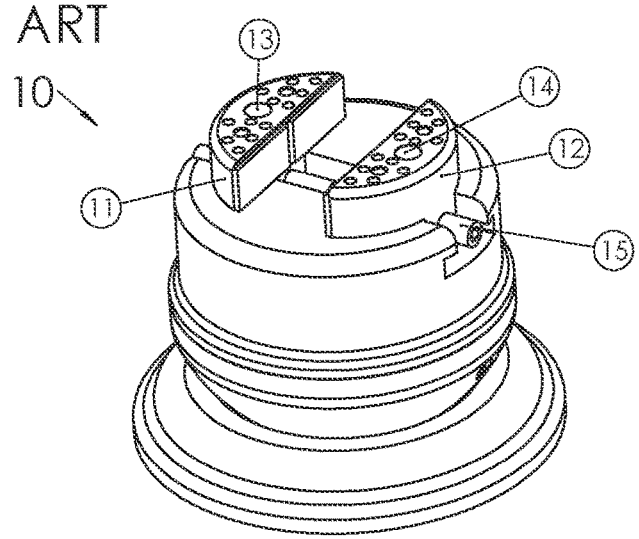
FIG. 2 is an isometric view of a smaller prior art ball vise 10 that is smaller than the prior art ball vise 1 depicted in FIG. 1.

A prior art ball vise 1 is illustrated in FIG. 1. Pertinent features of prior art ball vise 1 are jaw 2, jaw 3, hole 4, hole 5 and screw 6. A user turning screw 6 will open and close jaw 2 and jaw 3 together or apart. A smaller prior art vise 10 is illustrated in FIG. 2. Pertinent features of smaller prior art ball vise 10 are jaw 11, jaw 12, hole 13, hole 14 and screw 15. A user turning screw 15 will open and close jaw 11 and jaw 12 together or apart.

Figure 3:
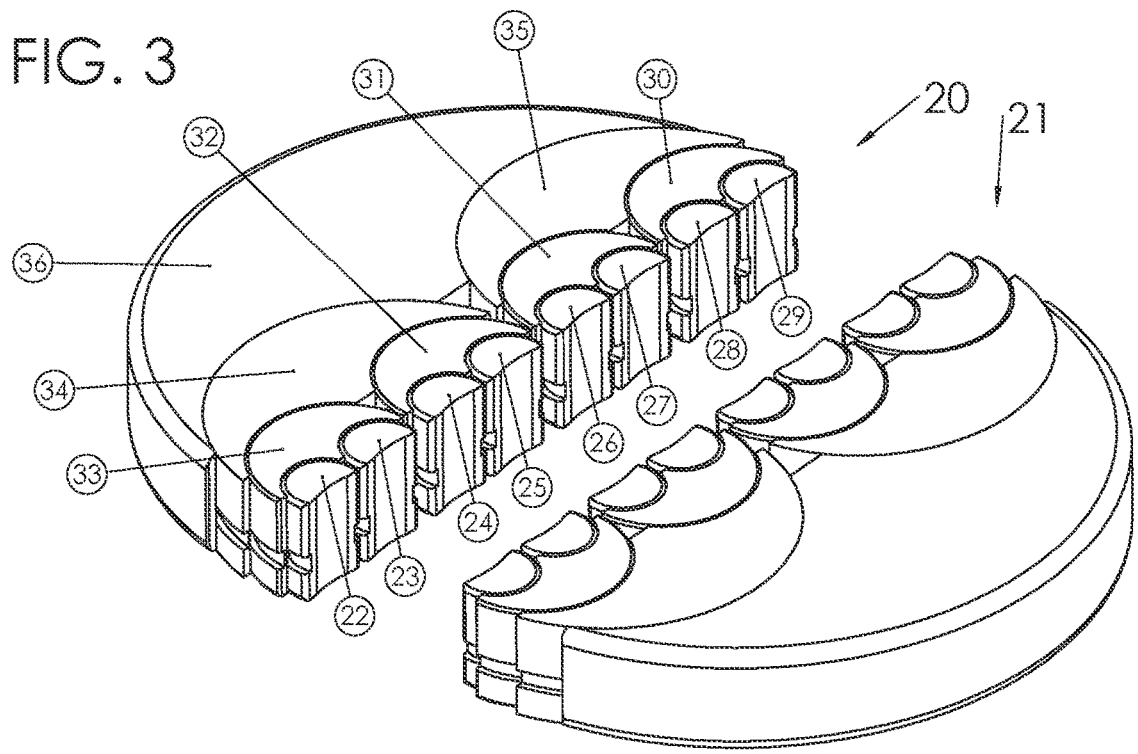
FIG. 3 is a top isometric view of a set of morphing jaws 20 and 21 in accordance with the present invention.
Figure 4:
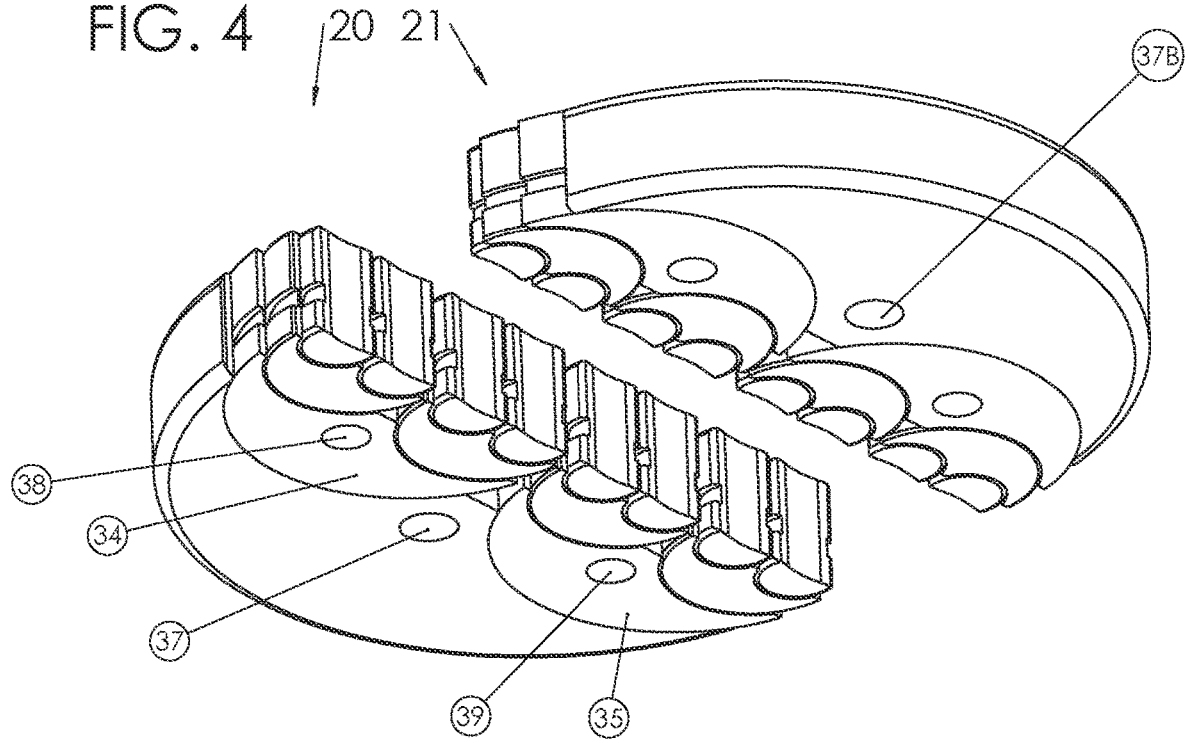
FIG. 4 is a bottom isometric view of the same set of morphing jaws 20 and 21 depicted in FIG. 3 in accordance with the present invention.
Figure 5:
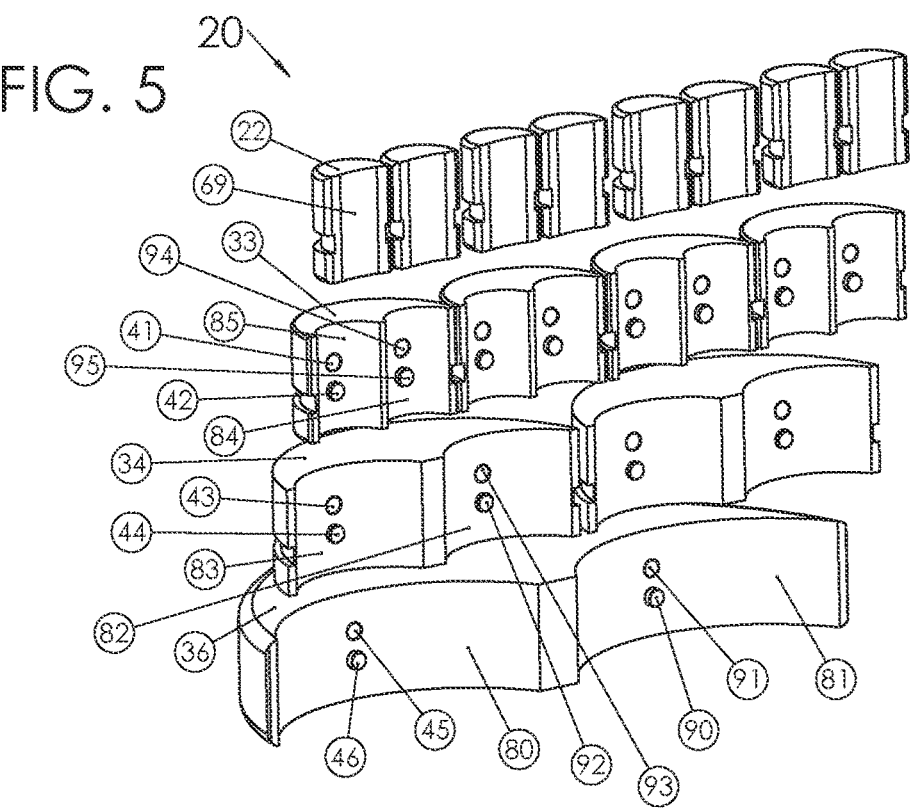
FIG. 5 is an isometric exploded front view of morphing jaw 20 depicted in FIG. 3 and FIG. 4.
Figure 6:
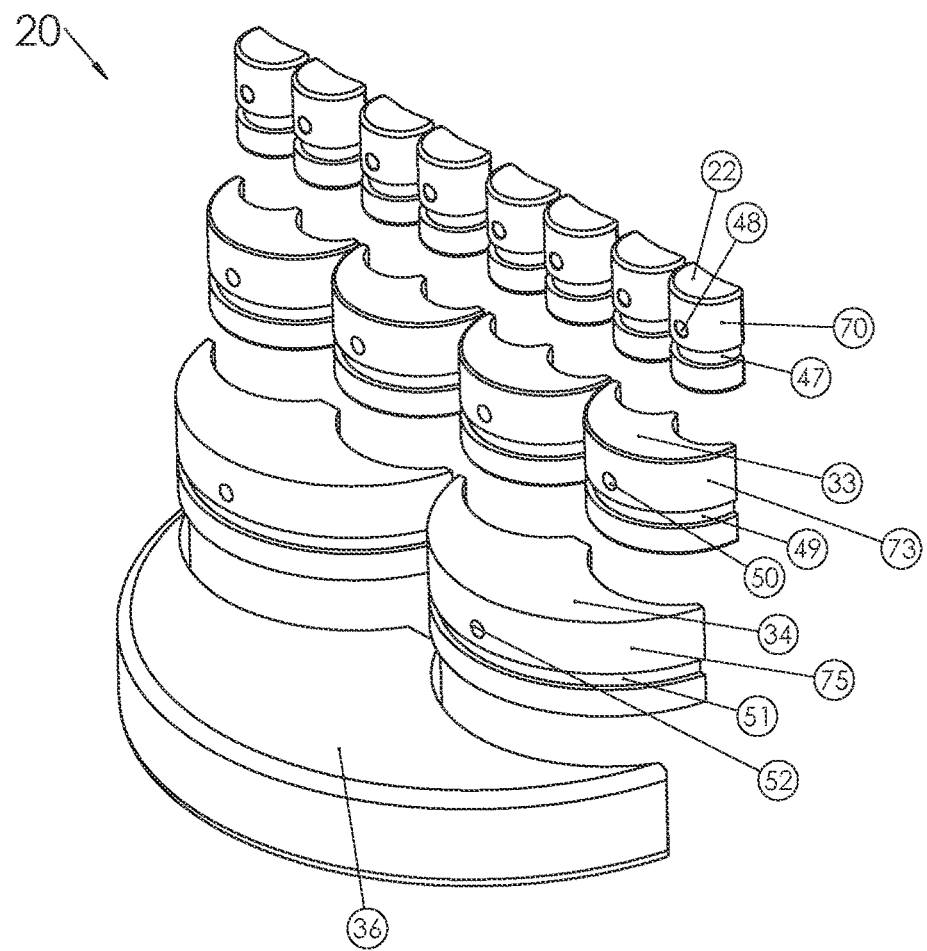
FIG. 6 is an isometric exploded rear view of morphing jaw 20 that is depicted in FIG. 5, in accordance with the present invention.

FIG. 3 and FIG. 4 depict morphing jaws 20 and 21 in accordance with the present invention. Jaws 20 and 21 are identical to each other and have the same features. FIG. 5 and FIG. 6 illustrate jaw 20 taken apart so that additional featured can be depicted. Jaw 20 consists of a series of tiers or rows of components nested together. Referring to FIG. 3, a list of nested members of jaw 20 are:

Clamping members 22, 23, 24, 25, 26, 27, 28, 29.
2nd-tier-bow-members 33, 32, 31, 30.
3rd-tier-bow-members 34, 35.
4th-tier-bow-member 36.

The first tier are clamping members, the second, third, and forth tiers are members that are bow shaped members. FIG. 3 and FIG. 4 depict the tiers in their natural center position.

In each level of tier, the members of that tier have identical features. In the following applicant will describe the first member of each tier and how they work and nest together with the first members from adjoining tiers. The remaining members of each tier fit and nest together in the same manner.

Referring to FIG. 6 and FIG. 5, features to the member of the first tier is clamping member 22. Clamping member 22 consists of a clamping surface 69, a radius-surface 70, a magnet 48, and a groove 47. Clamping surface 69 (FIG. 5) is the surface that contacts against an object that is being clamped. Clamping surface 69 can be curved so that the center is recessed or it can be flat. (An example of curved is illustrated in prior art U.S. Pat. No. 1,405,325 to Posch in FIG. 3, called crescent-shaped clamp member 20 in the prior art.) If clamping surface 69 is made with a curved surface it may clamp in two locations on clamping surface 69. However with it curved there is a greater risk that the object being clamped will be dented or marred verses if clamping surface 69 is made flat. For engravers and jewelers care must be taken not to dent or damage what is being help and so for that field of use it is preferred flat or mildly curved. Referring to FIG. 6 and FIG. 5, magnet 48 is rigidly fastened flush or just below flush of radius-surface 70.

Referring to FIG. 3, the second tier or row that are identical to each other are 2nd-tier-bow-members 33, 32, 31, 30. Referring to FIG. 5 and FIG. 6, 2nd-tier-bow-member 33 consists of an radius-surface 73, a groove 49, a magnet 50 rigidly fastened flush or just below flush radius-surface 73, a 1st-concave-surface 85 having an inner-magnet 41 that is flush or just below the surface of 1st-concave-surface 85, a protruding-pin 42 that protrudes slightly above the surface of 1st-concave-surface 85, a 2nd-concave-surface 84 having an inner-magnet 94 that is rigidly fastened flush or just below the surface of 2nd-concave-surface 84, a protruding-pin 95 that protrudes slightly above the surface of 2nd-concave-surface 84.

Referring to FIG. 3, the third tier or row that are identical to each other are 3rd-tier-bow-members 34, 35. Referring to FIG. 5 and FIG. 6, 3rd-tier-bow-member 34 consists of an radius-surface 75, a groove 51, a magnet 52, a 1st-concave-surface 83 having an inner-magnet 43 that is flush or just below the surface of 1st-concave-surface 83, a protruding-pin 44 that protrudes slightly above the surface of 1st-concave-surface 83, a 2nd-concave-surface 82 having an inner-magnet 93 that is flush or just below the surface of 2nd-concave-surface 82, a protruding-pin 92 that protrudes slightly above the surface of 2nd-concave-surface 82. Referring to FIG. 4 that is a bottom view of the assembly illustrating that bow-shape-member 34, and bow-shape-member 35 also include dowel-pin hole 38 and dowel-pin hole 39, respectfully.

Referring to FIG. 3, the fourth tier or row consists of a single member, 4th-tier-bow-member 36. Referring to FIG. 5 and FIG. 6 4th-tier-bow-member 36 consists of a 1st-concave-surface 80 having an inner-magnet 45 that rigidly fastened flush or just below the surface of 1st-concave-surface 80, a protruding-pin 46 that protrudes slightly above the surface of 1st-concave-surface 80, a 2nd-concave-surface 81 having an inner-magnet 91 that is flush or just below the surface of 2nd-concave-surface 81, a protruding-pin 90 that protrudes slightly above the surface of 2nd-concave-surface 81. FIG. 4 is a bottom view of the assembly illustrating that bow-shape-member 36 also includes dowel-pin hole 37 and identified in jaw 21 (FIG. 4) as dowel-pin hole 37B.

Operation

The tiers or rows of nested components of morphing jaw 20 fit and interact together as follows. Referring to FIG. 5 and FIG. 6, radius-surface 70 of clamping member 22 is made to fit in 1st-concave-surface 85 of 2nd-tier-bow-members 33 with a fit that allows the two surfaces to slide. Magnet 48 that is rigidly mounted into radius-surface 70 will hold clamping member 22 within 1st-concave-surface 85 that is made of a metal having iron in it. Protruding-pin 42 fits into groove 47 with a sliding fit which keeps clamping member 22 and 2nd-tier-bow-member 33 colinear aligned, but allows clamping member 22 to freely rotate within 1st-concave-surface 85. Inner-magnet 41 is mounted in 1st-concave-surface 85 so that it's polarity will attract magnet 48 that is mounted in radius-surface 70. With the magnets mounted in this way they help realign clamping member 22 back to its neutral center position when the magnets are close enough to pull clamping member 22 back to center. It is noted that clamping member 22 can be made of a material that does or does not have iron in it and the arrangement will still work. In other words, as long one, either clamping member 22 or 1st-concave-surface 85 is made of a material that has iron it in, the two will be held together when they are turned even when their magnets are not aligned. Therefore clamping member 22 can be made of a metal with iron, or a material without iron for example a soft non marring material such as brass or plastic. It is also noted that rather than a magnet in both of the mating surfaces of adjacent members only one magnet can be used. For example inner-magnet 41 can be left out and not mounted in 1st-concave-surface 85. In this configuration magnet 48 that is mounted into radius-surface 70 will hold clamping member 22 into 1st-concave-surface 85 if it is made of a material containing iron. Similarly the same can be done with members in the other tiers by the use of one magnet to hold mating members together. However with the use of one magnet to hold adjacent members together the benefit of them being self aligning is not realized like it is when two are used. Applicant prefers the use of two attracting magnets between members so that they have bias to recenter themselves when an object is un-clamped.

Radius-surface 73 of 2nd-tier-bow-member 33 is made to fit in 1st-concave-surface 83 of 3rd-tier-bow-member 34 with a fit that allows the two surfaces to slide. Magnet 50 that is rigidly mounted into radius-surface 73 will hold 3rd-tier-bow-member 34 within 1st-concave-surface 83 that is made of a metal having iron in it. Protruding-pin 44 fits into groove 49 with a sliding fit which keeps 2nd-tier-bowmember 33 and 3rd-tier-bow-member 34 colinear aligned, but allows 2nd-tier-bow-member 33 to freely rotate within 1st-concave-surface 83. Inner-magnet 43 has been mounted in 1st-concave-surface 83 so that its polarity will attract magnet 50 that is mounted in radius-surface 73. With the magnets mounted in this way they help realign 2nd-tier-bow-member 33 back to its neutral center position when the magnets are close enough to pull 2nd-tier-bow-member 33 back to center.

Radius-surface 75 of 3rd-tier-bow-member 34 is made to fit in 1st-concave-surface 80 of 4th-tier-bow-member 36 with a fit that allows the two surfaces to slide. Magnet 52 that is rigidly mounted into radius-surface 75 will hold 3rd-tier-bow-member 34 within 1st-concave-surface 80 that is made of a metal having iron. Protruding-pin 46 fits into groove 51 with a sliding fit which keeps 3rd-row-tier-bow-member 34 and 4th-tier-bow-member 36 colinear aligned, but allows 3rd-row-tier-bow-member 34 to freely rotate within 1st-concave-surface 80. Inner-magnet 45 is mounted in 1st-concave-surface 80 so that its polarity will attract magnet 52 that is mounted in radius-surface 75. With the magnets mounted in this way they help realign 3rd-tier-bow-member 34 back to its neutral center position when the magnets are close enough to pull 3rd-tier-bow-member 34 back to center.

Figure 7:
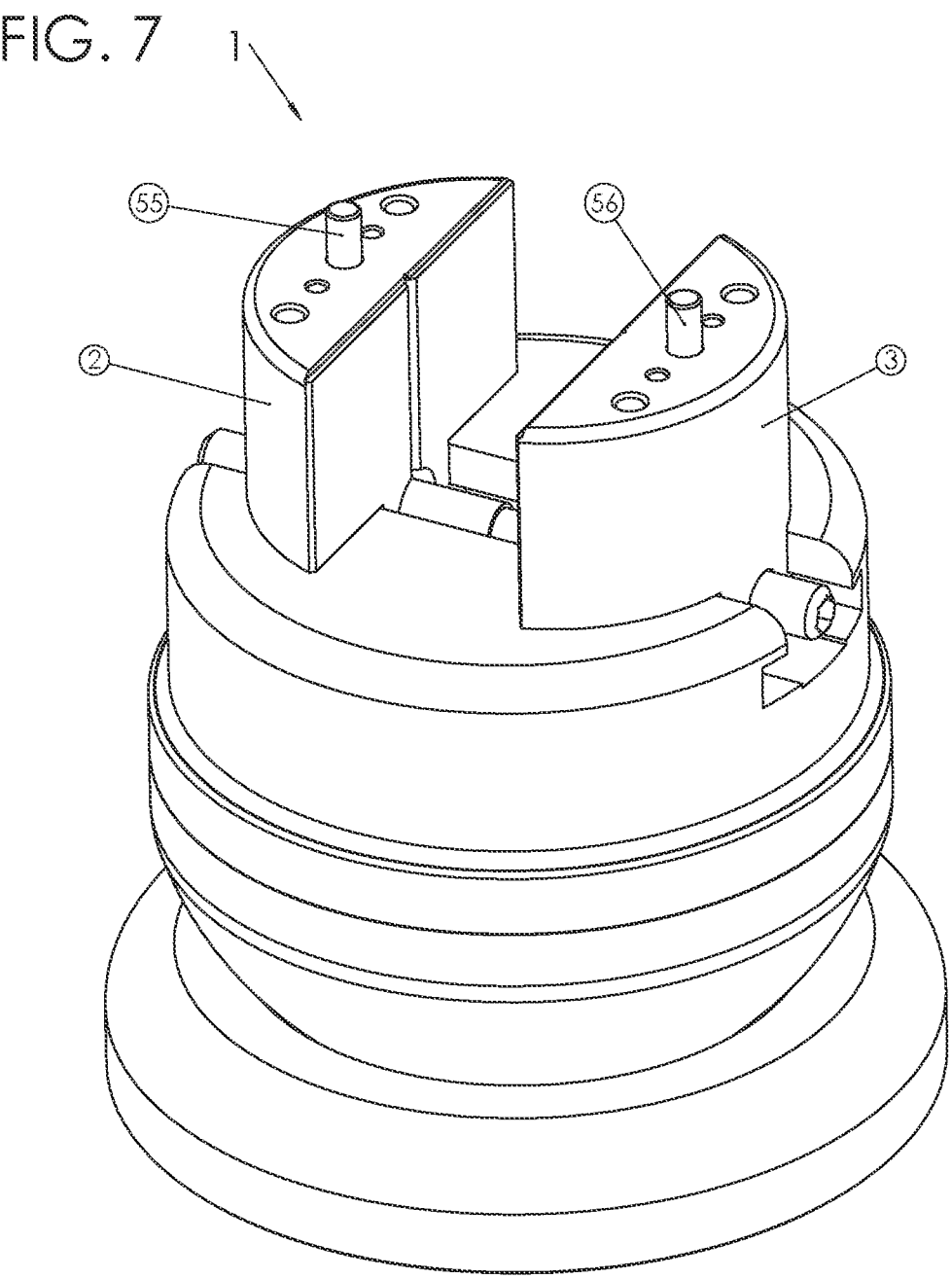
FIG. 7 is an isometric view of the same prior art ball vise 1 depicted in FIG. 1, but differing in that a dowel pin 55 have been inserted into hole 4 (FIG. 1) and that a dowel pin 56 has been inserted in hole 5 (FIG. 1).

In accordance with the present invention the process of installing and using morphing jaws 20 and 21 (FIG. 3, FIG. 2) on a prior art vise that the end user can carry out is: Referring to FIG. 7 illustrates a prior art ball vise 1. Dowel pin 55 and dowel pin 56 are installed into the existing jaws on prior art ball vise 1. Note: Most traditional prior art ball vises that engravers and jewelers use have for over a century pin holes on the top of their jaws for accepting dowel pins as depicted. Prior art vises that do not have this hole feature for a dowel pin in each jaw may be drilled and reamed to size to fit dowel pins. For prior art vises that have pin holes on the top of their jaws but the pin holes are a different size of what dowel pin 55 and dowel pin 56 are: For this situation stepped pins that have a larger diameter on one end and a smaller diameter on their other end can be utilized.

Figure 8:
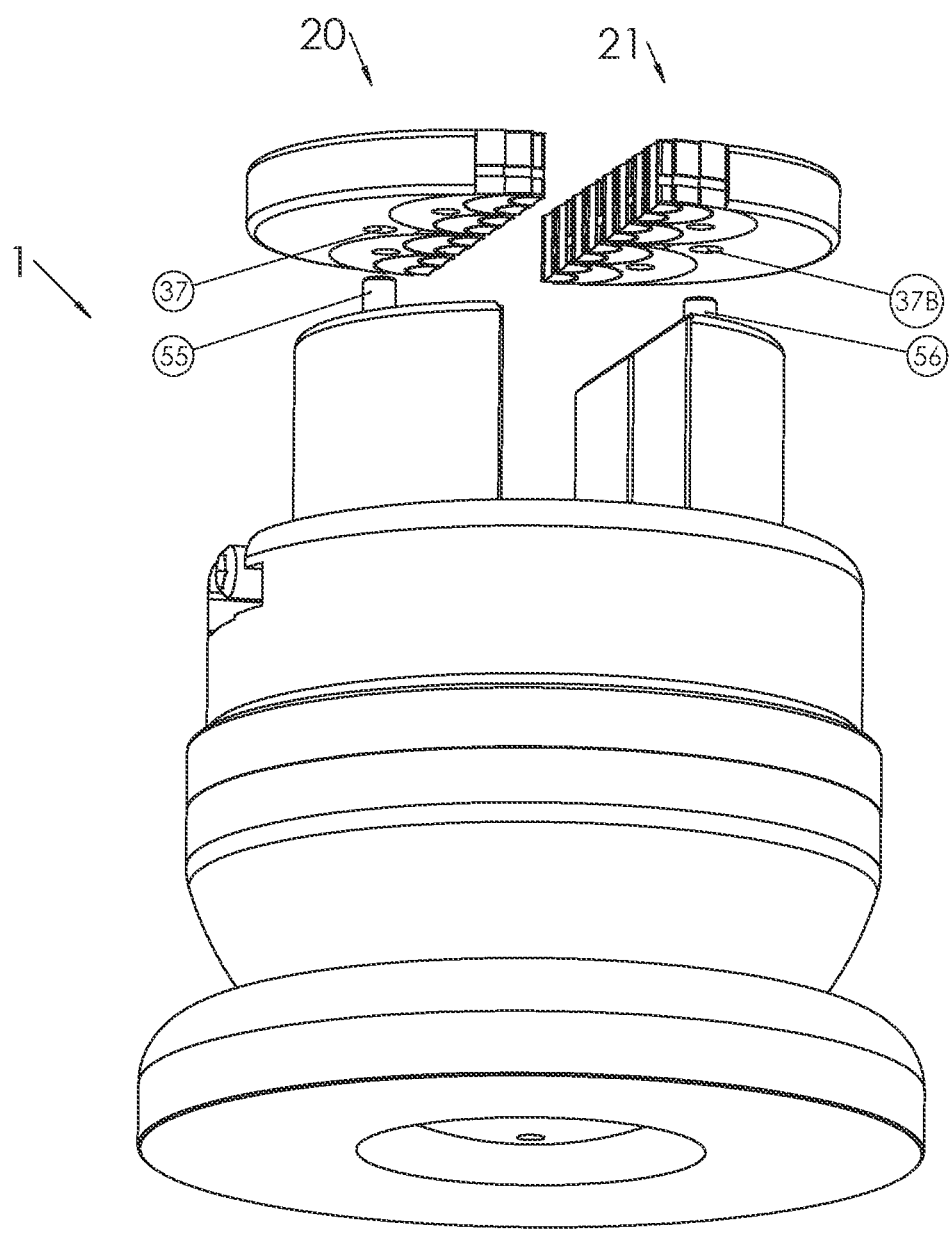
FIG. 8 is a lower view of the same prior art ball vise 1 depicted in FIG. 7 together with morphing jaws 20 and 21 depicted in FIG. 4 and FIG. 5.
Figure 9:
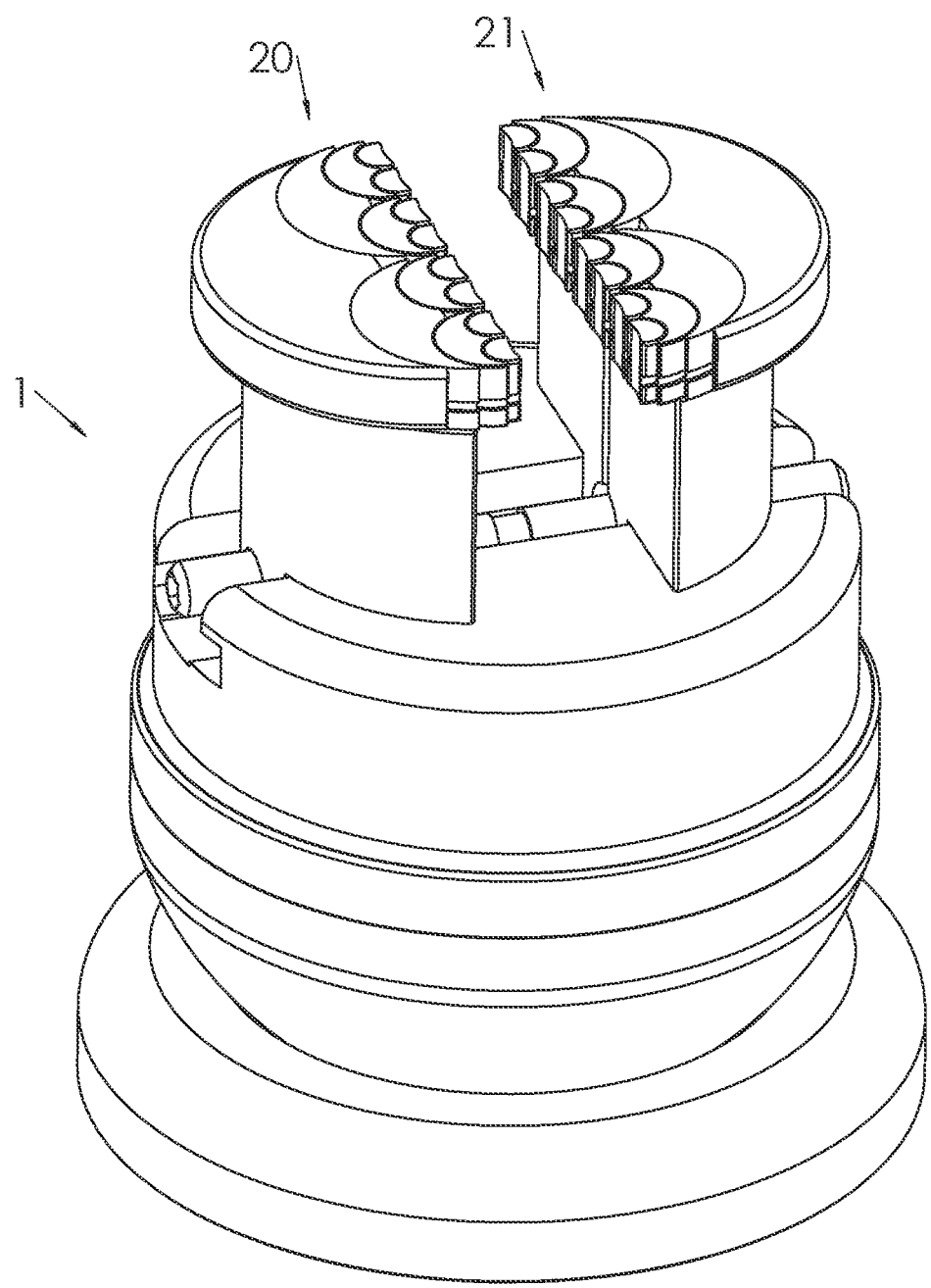
FIG. 9 is an isometric view depicting morphing jaws 20 and 21 after they have been installed on prior art ball vise 1, in accordance with the present invention.
Figure 10:
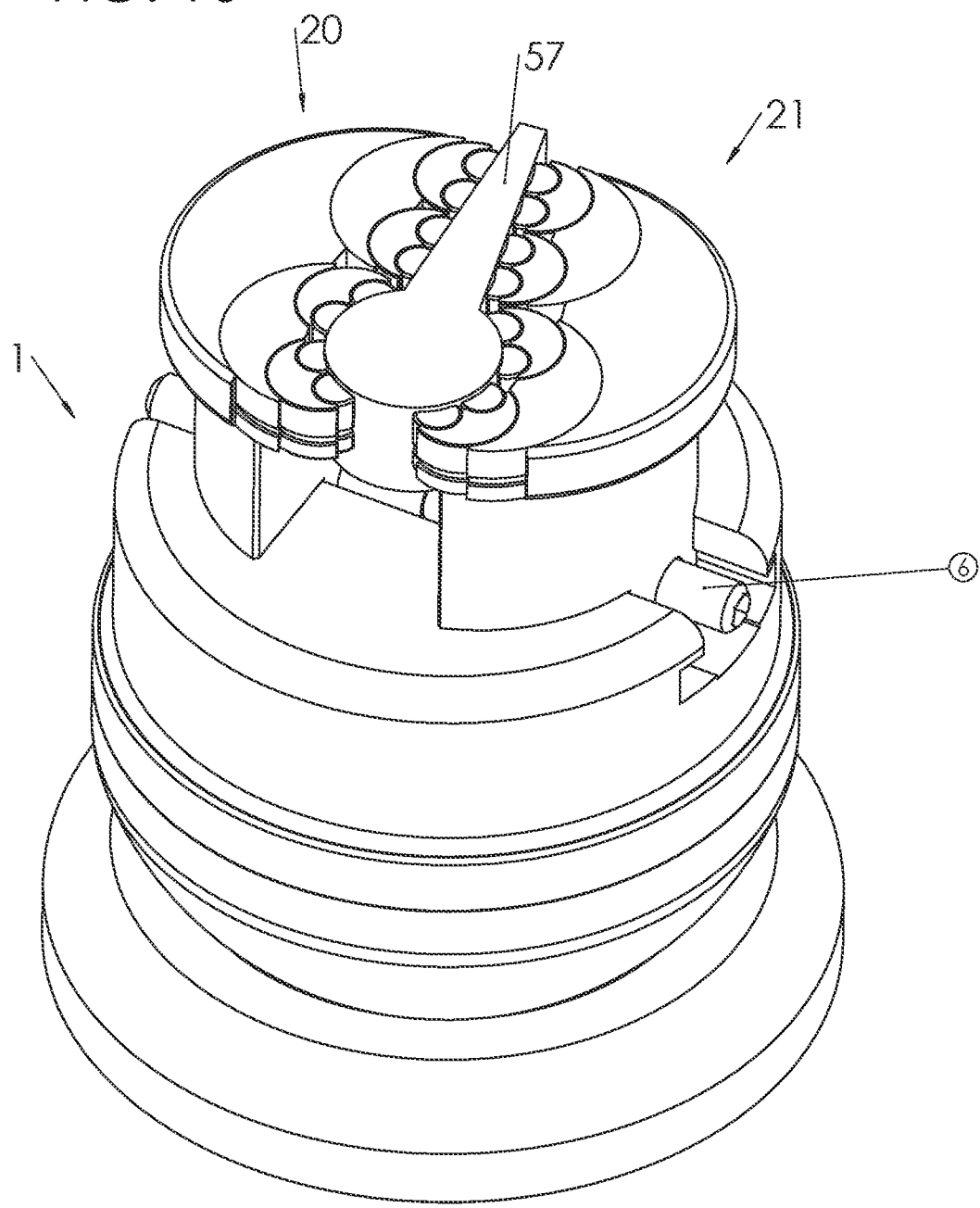
FIG. 10 is an isometric view depicting morphing jaws 20 and 21 after they have been installed on prior art ball vise 1, and an irregular shaped object 57 has been clamped in morphing jaws 20 and 21 showing how morphing jaws 20 and 21 will conform to the shape of the irregular shaped object 57, in accordance with the present invention.

FIG. 8 illustrates morphing jaws 20 and 21 being aligned and installed. Dowel pin 55 is aligned with dowel pin hole 37 in morphing jaw 20 and dowel pin 56 is aligned with dowel pin hole 37B for morphing jaw 21. FIG. 9 depicts morphing jaws 20 and 21 installed on prior art ball vise 1 and ready for use. Morphing jaw 20 can pivot freely on dowel pin 55 and morphing jaw 21 can pivot freely on dowel pin 56. In the drawings the figures illustrate the outer surface of 4th-tier-bow-member 36 in the form of a convex radius surface, however this surface could be another shape since the rotation pivot support for 4th-tier-bow-member 36 is done with dowel pin hole 37 and dowel pin 55 that fits into dowel pin hole 37 with a rotational sliding fit. FIG. 10 illustrates how morphing jaws 20 and 21 will conform to the shape of the irregular shaped object 57 when the irregular shaped object 57 is held between morphing jaws 20 and 21 and screw 6 is closed to bias morphing jaws 20 and 21 together. When the user wishes to remove the irregular shaped object 57, the arrangement of the magnets if the two polarities are close enough will automatically pull the members to center. For members whose magnets are not close enough, the user can manually move a member until they are close enough for magnets to pull and center that member.

In accordance with the present invention the jaws can be disassembled easily by a user for cleaning. Simply pulling a member in the direction away from the concave-surface of another member allows the magnetism of the magnets to be overcome for the member to separate. The members sliding surfaces are wiped off and then reassembled.

Figure 11:
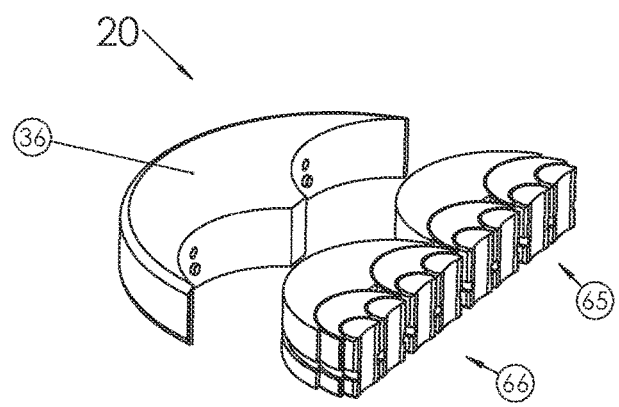
FIG. 11 is an isometric view of the morphing jaw 20 and how 4th-tier-bow-member 36 can be removed leaving sub-jaw 65 and sub-jaw 66 that can then be utilized by the user on smaller prior art vises, in accordance with the present invention.
Figure 12:
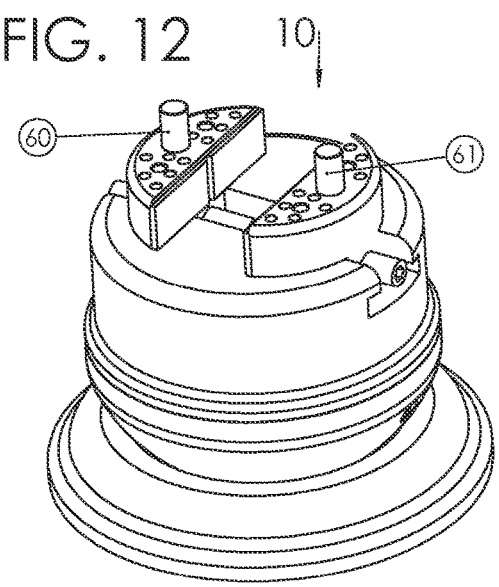
FIG. 12 is an isometric view of the same prior art ball vise 10 depicted in FIG. 2, but differing in that a dowel pin 60 has been inserted into hole 13 (FIG. 2) and that a dowel pin 61 has been inserted in hole 14 (FIG. 2).
Figure 13:
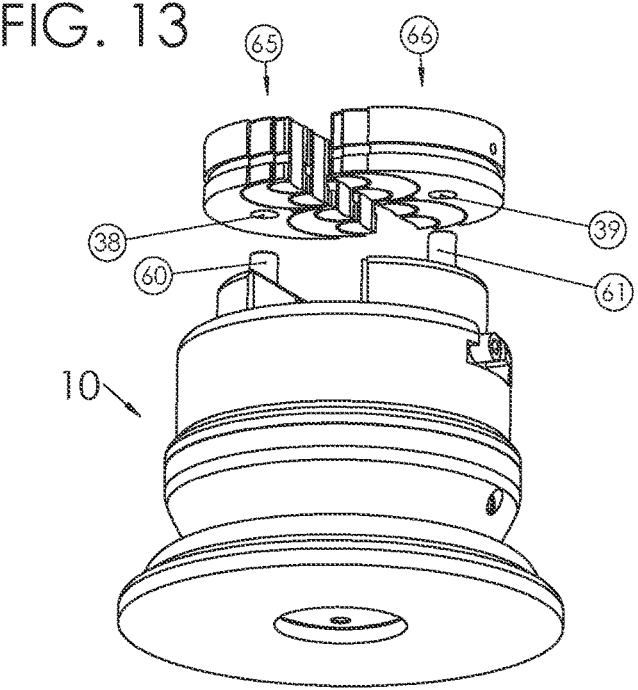
FIG. 13 is a lower isometric view of the same prior art ball vise 10 depicted in FIG. 12 together with sub-jaw 65 and sub-jaw 66 depicted in FIG. 11.
Figure 14:
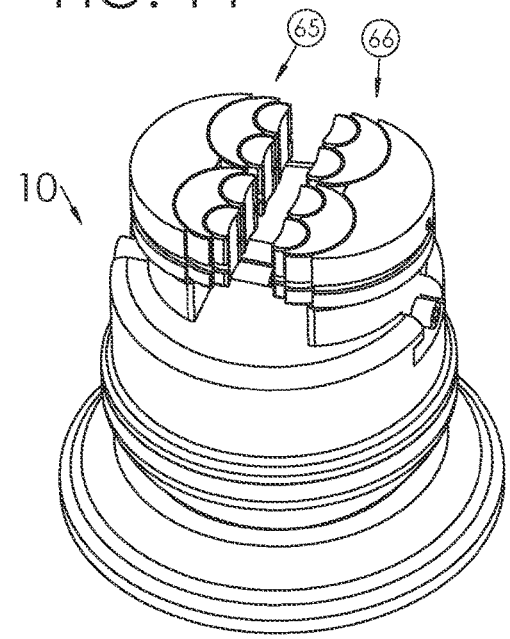
FIG. 14 is an isometric view depicting sub-jaw 65 and sub-jaw 66 depicted in FIG. 11 after they have been installed on prior smaller art ball vise 10, in accordance with the present invention.

In accordance with the present invention morphing jaws 20 and 21 can be utilized for use on smaller prior art vises. The process is as follows. FIG. 11 depicts morphing jaw 20 with 4th-tier-bow-member 36 pulled away leaving sub-jaw 65 and sub-jaw 66. FIG. 12 is a view of smaller prior art ball vise 10 with dowel pin 60 and dowel pin 61 installed into the existing jaws of smaller prior art ball vise 10. FIG. 13 illustrates sub-jaw 65 and sub-jaw 66 being aligned and installed on smaller prior art ball vise 10. Dowel pin 60 is aligned with dowel pin hole 38 in sub-jaw 65 and dowel pin 61 is aligned with dowel pin hole 39 for sub-jaw 66. Sub-jaw 65 can pivot freely on dowel pin 60 and sub-jaw 66 can pivot freely on dowel pin 61. FIG. 14 depicts morphing sub-jaw 65 and sub-jaw 66 installed on smaller prior art ball vise 10 and ready for use.

CONCLUSION, RAMIFICATIONS, AND SCOPE

Accordingly, the reader will see that the present invention provides users an opportunity to allow them to retro-fit their prior art vise to use morphing jaws that can conform to irregular shaped objects. The unique morphing jaws are modular so the user can utilize the jaws on other prior art vises and other prior vises that are smaller. The invention design allows ease of disassembly by users for cleaning and also reassembly. Since there is not a delicate dovetail used such as in U.S. Pat. No. 1,405,325 to Posch, the problems with members jamming or a piece of a dovetail breaking is eliminated. With the use of magnets in the invention to hold members together, another benefit is created and that is help to return members back to their neutral center position when an object is un-clamped. This means the user does not have as much of a job of having to center them himself or herself before clamping the next object.

Although the invention has been described with reference to the various embodiments, it should be noted that equivalents may be employed and substitutions made therein without departing from the scope of the invention as recited in the claims. For example: Applicant has illustrated ball vises for the prior art vises to place the morphing jaws on, however the invention jaws can be utilized on other type of prior art vises. Dowel pins are illustrated and used to pivot the last single tier of the jaw, however the last single tier can instead be rigidly mounted without departing from the present invention. The fewer tiers used the less shaping the jaw clamping members can adjust to conform, however even with a set of two tiers the method still provides benefits of working to conform without departing from the present invention. In other words, a two tier morphing jaw example is: clamping members 22 and 23 nested in 2nd-tier-bow-member 33. A dowel pin hole for attaching to a prior art vise would then be added to the bottom of 2nd-tier-bow-member 33 for it to pivot on. Another equivalent example is rather than the use of magnets, torsion springs could be used to return members back to their neutral position. Recesses for a torsion springs can be on the bottom of members. The middle of the torsion spring would be in one member while the legs of the torsion spring would reside in a recess on the fitting member of it so that the spring is at rest while the members are centered and are under tension when the members are not centered. Another equivalent is rather than the use of magnets to bias the members together, a wire spring arrangement could be employed between the members together with a slot or groove for the wire to hook into. Another equivalent example is the size of hole 13 and hole

14 (FIG. 8), can be larger than the size that they are illustrated, as can dowel pin 55 and dowel pin 56 (FIG. 8) be larger than the size that they are illustrated, as can dowel pin hole 38 and dowel pin hole 39 (FIG. 13) be larger than the size that they are illustrated, as can dowel pin 60 and dowel pin 61 (FIG. 13) be larger than the size that they are illustrated. Another equivalent example is bow-shape-member 36 and dowel pin 55 could be made as one solid piece rather than two separate parts. Another equivalent example is dowel pin 55 could instead be a screw that used through bow-shape-member 36 and threaded into the top of a prior art vise jaw such as jaw 2 (FIG. 1). Such a screw would eliminate dowel pin 55 (FIG. 7). Or such a screw could be combined with dowel pin 55 by making dowel pin 55 hollow for the screw to go through and to be configured to allow bow-shape-member to pivot. Applicant has been a hand engraver for 46 years and has worked with many vise jaw designs. Therefore the field of the invention use for the applicant is hand engraving and jewelry making fields, however the invention can be utilized in other fields that also use a vise. Accordingly, the scope of the invention should be determined not by the embodiments illustrated, but by the appended claims and their legal equivalents.

I claim:

1. A method for installing and using a morphing jaw assembly on a vise, the method comprising:
   providing a first dowel pin and a second dowel pin, each dowel pin having a first end and a second end;
   providing a vise, the vise including a first jaw, a second jaw, and a screw, the first jaw and the second jaw opposing each other, the screw configured to open or close the first and second jaws relative to each other based on rotation of the screw, the first jaw and the second jaw each having a cylindrical hole configured for receiving the first end of a respective dowel pin among the first and second dowel pins;
   providing a first morphing jaw and a second morphing jaw, each morphing jaw including:
      four first-tier clamping members, each first-tier clamping member including a front clamping surface and a rear radius surface, the front clamping surface for contacting an object that is to be constrained by the morphing jaw assembly,
      two second-tier bow members, each second-tier bow member including a bottom surface, a first concave surface, a second concave surface, and a rear radius surface, the first concave surface and the second concave surface magnetically coupled to a corresponding rear radius surface of a corresponding one of the four first-tier clamping members, and
      a third-tier bow member, the third-tier bow member including a bottom surface, a first concave surface, a second concave surface, and a rear radius surface, the first concave surface and the second concave surface magnetically coupled to a corresponding rear radius surface of a corresponding one of the two second-tier bow members,
      wherein the bottom surface of the third-tier bow member includes a cylindrical hole configured for receiving the second end of the respective dowel pin among the first and second dowel pins, and the bottom surface of the at least one of the two second-tier bow members includes a cylindrical hole configured for receiving the second end of the respective dowel pin among the first and second dowel pins;
   inserting the first end of the first dowel pin into the cylindrical hole of the first jaw;
   inserting the first end of the second dowel pin into the cylindrical hole of the second jaw;
   inserting the second end of the first dowel pin into the cylindrical hole of the third-tier bow member or the cylindrical hole of the at least one of the two second-tier bow member of the first morphing jaw such that the first morphing jaw is constrained by the first dowel pin to pivot about the first dowel pin and the cylindrical hole of the first jaw; and
   inserting the second end of the second dowel pin into the cylindrical hole of the third-tier bow member or the cylindrical hole of the at least one of the two second-tier bow member of the second morphing jaw such that the second morphing jaw is constrained by the second dowel pin to pivot about the second dowel pin and the cylindrical hole of the second jaw.

2. The method of claim 1, further comprising:
   positioning the object between the first morphing jaw and the second morphing jaw;
   closing the first and second jaws of the vise based on a first rotation direction of the screw; and
   capturing the object with the first and second morphing jaws based on the closing first and second jaws of the vise.

3. The method of claim 2, wherein capturing the object with the first and second morphing jaws includes each of the first and second morphing jaws transitioning from a first configuration to a second configuration as the first and second morphing jaws come into contact communication with the object, wherein the second configuration conforms to a shape of the object.

4. The method of claim 3, wherein the first and second morphing jaws transitioning from the first configuration to the second configuration each includes pivoting of at least one of: a first-tier clamping member among the four first-tier clamping members relative to the corresponding second-tier bow member, a second-tier bow member among the two second-tier bow members relative to the corresponding third-tier bow member, and the third-tier bow member relative to a corresponding jaw among the first jaw and the second jaw of the vise.

5. The method of claim 3, further comprises opening the first and second jaws of the vise based on a second rotation direction of the screw, the second rotation being in counter-rotation to the first rotation direction, thereby releasing the object captured by the first and second morphing jaws.

6. The method of claim 5, wherein the first and second morphing jaws are each configured to transition back to the first configuration in response to opening the first and second jaws of the vise.

7. The method of claim 6, wherein the first and second morphing jaws are each configured to transition back to the first configuration based on an attractive polarity of at least one set of magnet comembers.

8. The method of claim 1, further comprising removing the third-tier bow member from at least one of the first morphing jaw or the second morphing jaw.

9. A method for installing and using a morphing jaw assembly on a vise, the method comprising:
   providing a first dowel pin and a second dowel pin, each dowel pin having a first end and a second end;
   providing a vise, the vise including a first jaw, a second jaw, and a screw, the first jaw and the second jaw opposing each other, the screw configured to open or close the first and second jaws relative to each other based on rotation of the screw, the first jaw and the second jaw each having a hole configured for receiving the first end of a respective dowel pin among the first and second dowel pins;

providing a first morphing jaw and a second morphing jaw, each morphing jaw including:

eight first-tier clamping members, each first-tier clamping member including a front clamping surface and a rear radius surface, the front clamping surface for contacting an object that is to be constrained by the morphing jaw assembly, four second-tier bow members, each second-tier bow member including a bottom surface, a first concave surface, a second concave surface, and a rear radius surface, the first concave surface and the second concave surface magnetically coupled to a corresponding rear radius surface of a corresponding one of the eight first-tier clamping members, and two third-tier bow members, each third-tier bow member including a bottom surface, a first concave surface, a second concave surface, and a rear radius surface, the first concave surface and the second concave surface magnetically coupled to a corresponding rear radius surface of a corresponding one of the four second-tier bow members, a fourth-tier bow member, the fourth-tier bow member including a bottom surface, a first concave surface, a second concave surface, and a rear radius surface, the first concave surface and the second concave surface magnetically coupled to a corresponding rear radius surface of a corresponding one of the two third-tier bow members, wherein the bottom surface of the fourth-tier bow member includes a hole configured for receiving the second end of the respective dowel pin among the first and second dowel pins, and the bottom surface of the at least one of the two third-tier bow members or at least one of the four second-tier bow members includes a hole configured for receiving the second end of the respective dowel pin among the first and second dowel pins;

inserting the first end of the first dowel pin into the hole of the first jaw;

inserting the first end of the second dowel pin into the hole of the second jaw;

inserting the second end of the first dowel pin into the hole of the fourth-tier bow member, the hole of the third-tier bow member, or the hole of the second-tier bow member of the first morphing jaw such that the first morphing jaw is permitted to rotate, the first dowel pin prohibited from translational movement; and inserting the second end of the second dowel pin into the hole of the fourth-tier bow member, the hole of the third-tier bow member, or the hole of the second-tier bow member of the second morphing jaw such that the second morphing jaw is permitted to rotate, the second dowel pin prohibited from translational movement.

10. The method of claim 9, further comprising:

positioning the object between the first morphing jaw and the second morphing jaw;

closing the first and second jaws of the vise based on a first rotation direction of the screw; and capturing the object with the first and second morphing jaws based on the closing first and second jaws of the vise.

11. The method of claim 10, wherein capturing the object with the first and second morphing jaws includes each of the first and second morphing jaws transitioning from a first configuration to a second configuration as the first and second morphing jaws come into contact communication with the object, wherein the second configuration conforms to a shape of the object.

12. The method of claim 11, wherein the first and second morphing jaws transitioning from the first configuration to the second configuration each includes pivoting of at least one of: a first-tier clamping member among the eight first-tier clamping members relative to the corresponding second-tier bow member, a second-tier bow member among the four second-tier bow members relative to the corresponding third-tier bow member, a third-tier bow member among the two third-tier bow members relative to the corresponding fourth-tier bow member, and the fourth-tier bow member relative to a corresponding jaw among the first jaw and the second jaw of the vise.

13. The method of claim 11, further comprises opening the first and second jaws of the vise based on a second rotation direction of the screw, the second rotation being in counter-rotation to the first rotation direction, thereby releasing the object captured by the first and second morphing jaws.

14. The method of claim 13, wherein the first and second morphing jaws are each configured to transition back to the first configuration in response to opening the first and second jaws of the vise.

15. The method of claim 14, wherein the first and second morphing jaws are each configured to transition back to the first configuration based on an attractive polarity of at least one set of magnet comembers.

16. The method of claim 9, further comprising removing the fourth-tier bow member from at least one of the first morphing jaw or the second morphing jaw.

17. The method of claim 16, further comprising removing a third-tier bow member among the two third-tier bow members from at least one of the first morphing jaw or the second morphing jaw.

18. A method for installing and using a morphing jaw assembly on a vise, the method comprising:

providing a vise, the vise including a first jaw and a second jaw, the first jaw and the second jaw being configured to open and close relative to each other, the first jaw and the second jaw each having a hole for receiving a pin;

providing a first morphing jaw and a second morphing jaw, each morphing jaw including:

first-tier clamping members, each first-tier clamping member including a front clamping surface and a rear radius surface, the front clamping surface for contacting an object that is to be constrained by the morphing jaw assembly second-tier bow members, each second-tier bow member including a bottom surface, a first concave surface, a second concave surface, and a rear radius surface, the first concave surface and the second concave surface magnetically coupled to a corresponding rear radius surface of a corresponding one of the first-tier clamping members, and a third-tier bow member, the third-tier bow member including a bottom surface, a first concave surface, a second concave surface, and a rear radius surface, the first concave surface and the second concave surface magnetically coupled to a corresponding rear radius surface of a corresponding one of the second-tier bow members, wherein the bottom surface of the third-tier bow member includes a hole configured for receiving the pin of either the first morphing jaw or the second morphing jaw, and the bottom surface of the at least one of the second-tier bow members includes a hole configured for receiving the pin of either the first morphing jaw or the second morphing jaw;

providing the pin of the first jaw at the hole of the third-tier bow member or the hole of the at least one of the second-tier bow members of the first morphing jaw such that the first morphing jaw is permitted to rotate, the pin of the first jaw prohibited from translational movement; and providing the pin of the second jaw at the hole of the third-tier bow member or the hole of the at least one of the second-tier bow members of the second morphing jaw such that the second morphing jaw is permitted to rotate, the pin of the second jaw prohibited from translational movement.

19. The method of claim 18, further comprising:

positioning the object between the first morphing jaw and the second morphing jaw;

closing the first and second jaws of the vise; and capturing the object with the first and second morphing jaws based on the closing first and second jaws of the vise.

20. The method of claim 18, further comprises removing the third-tier bow member from at least one of the first morphing jaw or the second morphing jaw.

* * * * *